Figure 1:
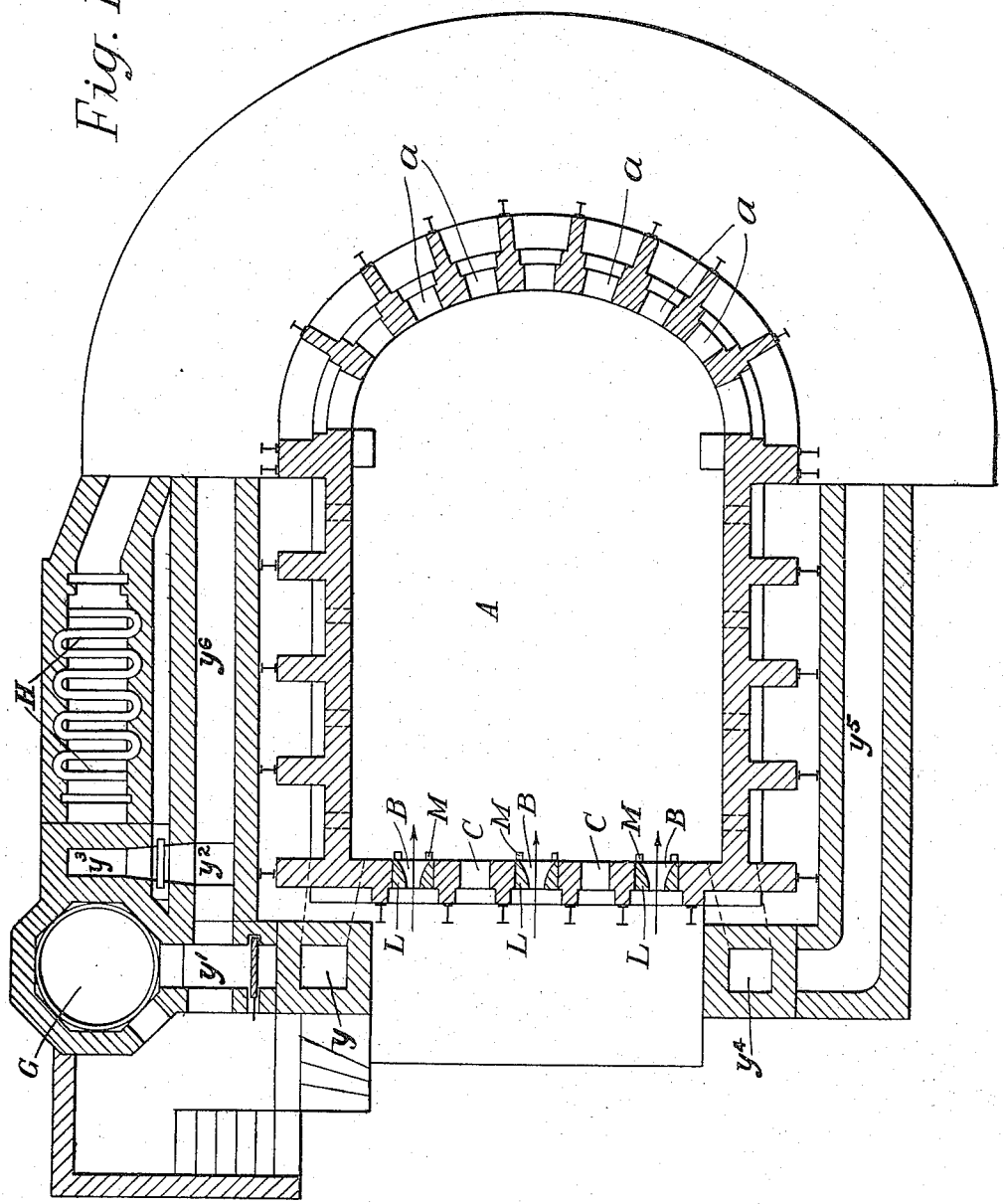

UNITED STATES PATENT OFFICE.

LUDWIG GROTE, OF TOTTENHAM, LONDON, ENGLAND, AND JULIUS ROTHKOPF, OF GAGNY, NEAR PARIS, FRANCE, ASSIGNORS TO HIGHAM MANUFACTURING COMPANY LIMITED, OF LONDON, ENGLAND, A JOINT-STOCK COMPANY OF LIMITED LIABILITY.

LIQUID-FUEL FURNACE.

1,150,758.

Specification of Letters Patent.

Patented Aug. 17, 1915.

Application filed November 13, 1913. Serial No. 800,813.

*To all whom it may concern:*

Be it known that we, LUDWIG GROTE, residing at 177 Mount Pleasant road, Tottenham, London, England, and JULIUS ROTHKOPF, residing at 11 Avenue Joannes, Gagny, near Paris, France, both subjects of the Emperor of Germany, have invented certain new and useful Improvements in Liquid-Fuel Furnaces, of which the following is a specification.

This invention has for its object improvements in or relating to furnaces for melting glass or other fusible substances and in or relating to oil firing of furnaces and apparatus therefor; and comprises a new or improved system or process for continuously working furnaces for melting glass or other substances and furthermore comprises an oil fuel furnace with double arch construction adapted to be heated by liquid fuel burners, and comprises other improvements in or relating to such furnaces and in apparatus for use in conjunction with such furnaces.

The present invention is (*inter alia*) designed (*a*) to provide or construct a continuously working, melting baking or tempering furnace with double arch construction which is primarily designed for melting glass but may be used for any purposes to which same may be applicable, (*b*) to utilize the heat of the waste or superfluous gases of the furnace for the production of superheated steam (*c*) to obtain a complete or very thorough combustion of the oil fuel in the furnace as free as possible from carbonization of the hydrocarbons employed in such liquid fuel burners and (*d*) to obtain great efficiency in the combustion of the liquid fuel.

The above objects are attained according to the present invention by the special construction of the furnace, by the employment of superheated steam (produced by the utilization of the heat of the waste or superfluous gases from the furnace) to assist in breaking up into the finest particles the oil fuel employed and especially when heavy liquid hydrocarbons such as tar, are employed in the burner, by sucking or drawing atmospheric air into the furnace through the burner nozzles; and by a novel arrangement and construction of air supply devices, for admitting and heating the air, which are provided or formed with telescope shaped tubes, or passages therethrough of differential bore, in passing through which the atmospheric air, etc., has its temperature raised (by means of the heat of the furnace) to such a degree as to greatly assist the combustion of the liquid hydrocarbons which have been converted into spray or very fine particles as aforesaid.

We will now describe the present invention with reference to the accompanying drawings which illustrate a furnace and the various fittings or adjuncts according to the present invention and which we will hereinafter describe as employed for melting glass.

Figure 2:
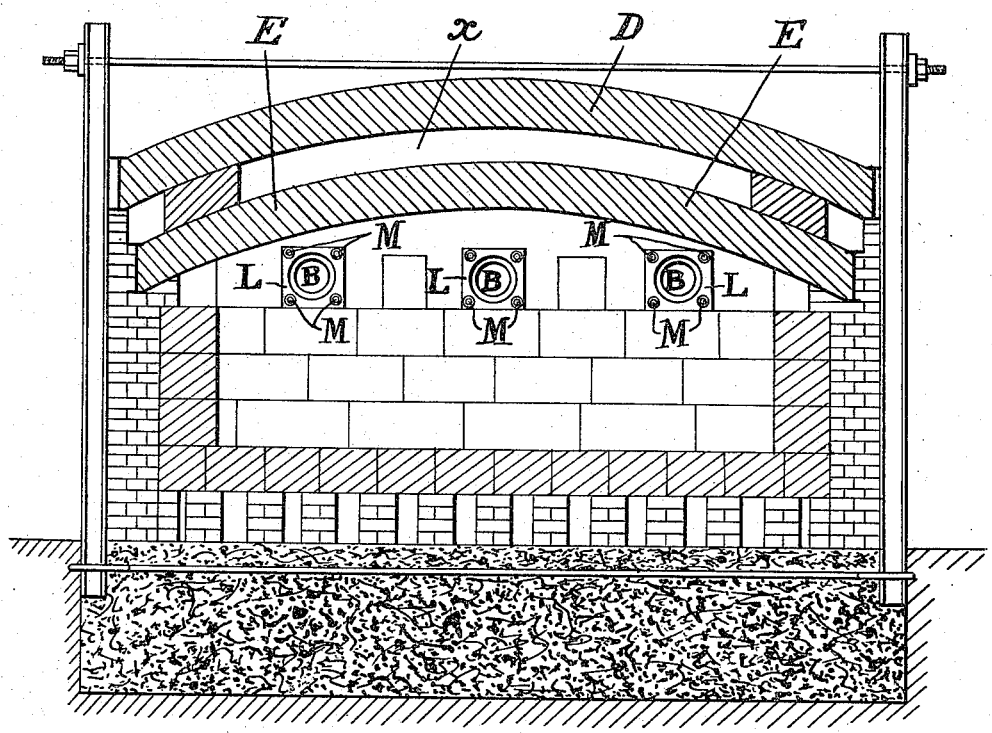
Figure 3:
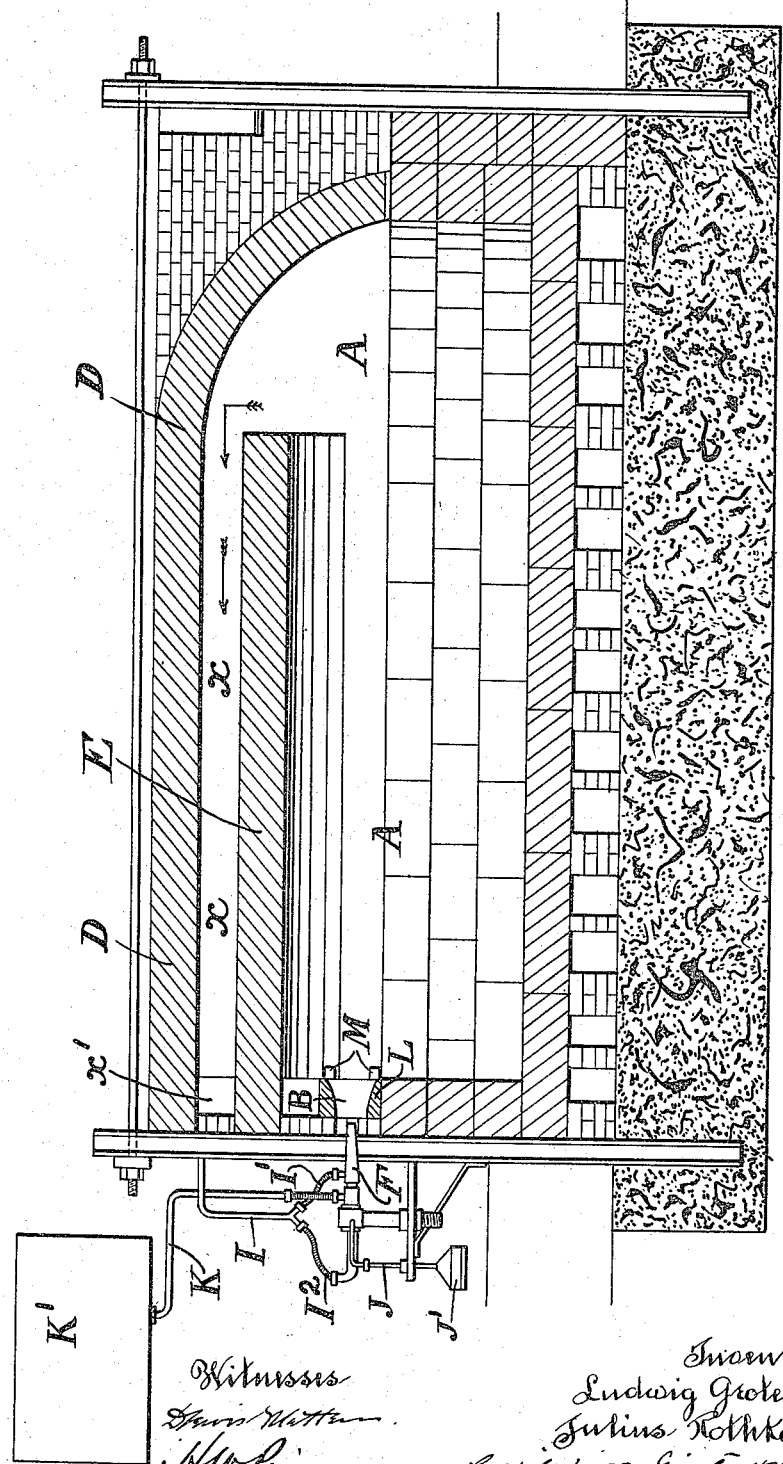
Figure 4:
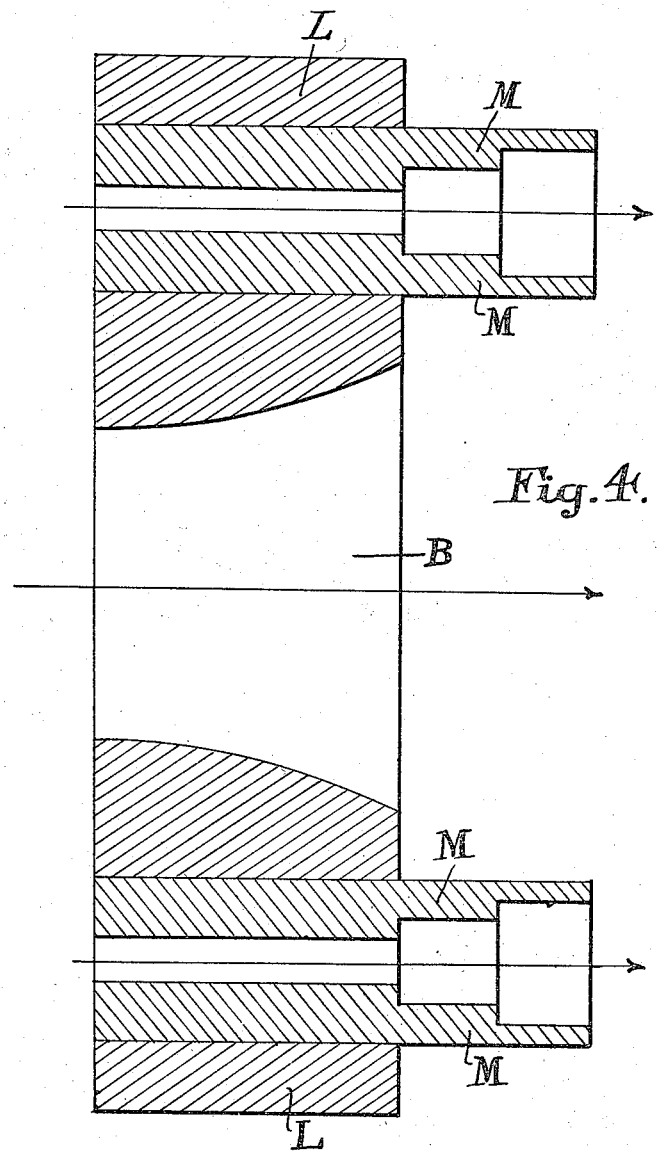

Figure 1 is a horizontal sectional view. Fig. 2 is a vertical cross sectional view of the furnace. Fig. 3 is a longitudinal vertical sectional view of the furnace. Fig. 4 is a sectional view (on an enlarged scale) of the special air supply devices hereinafter described with central passage for the oil flame and air to pass through and the inwardly projecting additional air inlet passages which are "stepped" or formed of differential bore.

A is the furnace chamber for the glass; which chamber at one end is provided with the usual or any suitable working holes or apertures *a* through which the glass is withdrawn for molding or other purposes; and at its other end said chamber is provided with a series of apertures B for the admission of the oil fuel, steam and air supply, etc., as hereinafter described. Also this last-named end of the furnace has the usual apertures such as C for "feeding" the furnace with the sand, soda, lime, etc.; such holes C being provided with doors or covers (not shown) for normally keeping said holes C closed.

The upper part of the furnace chamber A is formed with a double roof or double arch for a greater part of its length. For this purpose inside the ordinary roof or arch D an inner arch or a partition E is provided extending from the burner end of the furnace nearly to the other end inside the furnace chamber A so that a space forming a passage *x* is thus inclosed between said partition or inner arch E and the actual roof or arch D of the furnace, with the result that the heat from the liquid fuel burner or burners F is caused to travel practically the whole length of the furnace from the burner end to or toward the opposite end and thence the hot combustion gases return over the top of the partition E (along the passage $x$) between the partition E and the roof D toward the burner end; and near this burner end the hot gases pass out from the furnace advantageously through the lateral passage $x^1$ (see Fig. 3) and downwardly extending passage $y$ (see Fig. 1) and thence through the passage $y^1$ to a steam generator as indicated at G (Fig. 1) and through the passages $y^2$ $y^3$ to a steam superheater such as H (see also Fig. 1) and finally are allowed to escape into a chimney or otherwise. If desired some of the hot combustion gases passing through the passage $x$ may pass out laterally on the opposite side of the furnace through a passage similar to the lateral passage $x^1$ (Fig. 3) and thence pass through the downwardly extending passage $y^4$ and thence along the passage $y^5$ (a similar passage $y^6$ being provided on the opposite side of the furnace if desired) to any desired point where same may be utilized as for example for raising steam for power purposes or said hot combustion gases may be led into ovens or chambers in which the glass ware is placed for tempering, etc. The result of this double roof construction of the furnace is that by passing the hot gases through the space $x$ between the double arches and thereby highly heating the inner arch or partition E an intense heat is radiated or directed or imparted onto the body of glass in the furnace chamber A, while the wide fluctuations of temperature to which the material undergoing melting etc. is subjected in an ordinary furnace constructed with only a single arch are avoided or reduced and the life of the furnace is prolonged; and furthermore the boilers such as G as well as the superheaters such as H in the flues are heated by the waste or superfluous gases, and the superheated steam thus produced can be used with great economy and advantage for spraying the liquid hydrocarbons and finally the superheated steam thus produced (with atmospheric air or ozonized air or oxygen) can be employed for obtaining combustion, free from carbonization, of the liquid hydrocarbons employed such as tar.

In the arrangement illustrated I is steam pipe coming from the superheater H with branch pipes $I^1$ and $I^2$ for leading the superheated steam from the superheater H to the liquid fuel burner or injector F.

J is pipe for leading a supply of air (or or oxygen) from the intake $J'$ to the interior of the burner or injector F.

K is pipe leading the supply of oil fuel from the oil reservoir $K^1$ to the interior of the burner or injector F.

The interior space in the furnace (i. e. the space between the inner arch and the surface of the body of glass, etc.) is reduced in height; while the too rapid escape of the heated products of combustion is prevented and the cooling of the arch over the surface of the glass etc. is avoided and thereby the cooling of the tank or furnace walls is avoided while the inner arch E becomes practically white hot and a very quick melting of the glass, etc., takes place.

The specially constructed air supply device (as illustrated in Fig. 4) consists of a structure L having centrally located therein the aforesaid aperture B (for the fuel and steam jet, etc.) and a series of telescope shaped tubes M located around said central aperture B and constructed with projecting inner ends formed with stepped bores; which tubes M according to this part of the present invention have the inner ends thereof projecting into the furnace chamber A and are thereby heated (especially by the heat of the furnace acting on said projecting inner end) from red to white heat and by this means the atmospheric air passing through said tubes M of the air supply devices L is heated to such a degree as to prevent the oil fuel (even if same contains a considerable quantity of pitch) sprayed from the nozzles F from settling on the material to be melted in the furnace.

The burners which may be of any suitable character and construction are arranged to act as injectors and the apertures B of the aforesaid air supply devices L (which may be made of best fire clay or other suitable heat resisting material) serve to introduce the flames of the burners F into the furnace chamber A.

In operation, the system or method and apparatus according to the present invention acts as follows:—The superheated steam mixed with air or oxygen passes through a tube or tubes with which the inlet of the liquid hydrocarbons is connected; and such liquid fuel which is under suitable pressure is carried along by the superheated steam and broken up into the finest particles before arriving in the melting tank or chamber A where combustion takes place (without any pitch settling on the surface of the material to be melted) and the injector F in connection with the use of superheated steam effectively (among other advantages) prevents the clogging of the nozzle.

The long flame or flames of the burner or burners pass across the furnace from the burner end to the opposite end and thereby the greatest heat is developed at or near the working holes $a$, i. e., at the point where the glass etc., is withdrawn for use for molding or other purposes, and thereby in the case of a glass furnace the glass is kept thoroughly melted clear and ready for working at this point.

What we claim is:—

1. The combination with a liquid fuel furnace having a front wall provided with apertures therein, of frames fitted in said apertures and provided with tapered openings, tubes supported in said frames and formed with inwardly projecting ends having stepped bores, and a burner arranged to introduce fuel through the tapered opening in each frame, substantially as described.

2. The combination with a furnace having a front wall provided with a fuel admission aperture, of a frame fitted in said aperture and provided with a tapered opening, a plurality of tubes in communication with the outside atmosphere mounted in said frame concentrically with the opening therein and provided with inwardly projecting ends having stepped bores, a burner arranged to introduce fuel through the opening in said frame, a source of fuel supply connected to said burner, an air supply hood, and a connection between said hood and the burner for introducing air to the latter to atomize the fuel, substantially as described.

3. A liquid fuel furnace including an arched roof, an arched partition arranged in spaced relation beneath said roof and terminating short of the latter at the rear end of the furnace, a front wall provided with a horizontally-arranged series of apertures therein, a plurality of frames fitted in alternate apertures and having tapered openings therein, tubes supported in said frame in communication with the atmosphere and provided with inwardly projecting ends formed with stepped bores, a burner arranged to introduce fuel through the opening in each of said frames, a steam supply in communication with said burner, a fuel supply in communication with said burner, an air hood for said burner, and a connection between said hood and burner, substantially as described.

In witness whereof we have hereunto set our hands in presence of two witnesses.

LUDWIG GROTE.
JULIUS ROTHKOPF.

Witnesses:
G. GANDER,
TRACY LAY.